(12) United States Patent
Gong et al.

(10) Patent No.: US 10,637,612 B2
(45) Date of Patent: Apr. 28, 2020

(54) INFORMATION TRANSMISSION METHOD AND APPARATUS

(71) Applicant: HUAWEI TECHNOLOGIES CO., LTD., Shenzhen, Guangdong (CN)

(72) Inventors: Zhengwei Gong, Shanghai (CN); Longbao Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/120,854

(22) Filed: Sep. 4, 2018

(65) Prior Publication Data

US 2018/0367238 A1    Dec. 20, 2018

Related U.S. Application Data

(63) Continuation of application No. PCT/CN2017/075524, filed on Mar. 3, 2017.

(30) Foreign Application Priority Data

Mar. 4, 2016   (CN) .......................... 2016 1 0125223
Oct. 14, 2016  (CN) .......................... 2016 1 0898002

(51) Int. Cl.
   *H04L 1/00*   (2006.01)
   *H04L 1/06*   (2006.01)
   (Continued)

(52) U.S. Cl.
   CPC .............. *H04L 1/009* (2013.01); *H04J 15/00* (2013.01); *H04L 1/00* (2013.01); *H04L 1/0009* (2013.01);
   (Continued)

(58) Field of Classification Search
   CPC ......... H04L 1/00; H04L 1/0009; H04L 1/009; H04L 1/0091; H04L 1/06; H04L 27/3488; H04L 5/0007; H04L 5/0037
   See application file for complete search history.

(56) References Cited

U.S. PATENT DOCUMENTS 6,789,196 B1 *   9/2004  Miyano ................ H04N 5/4401
                                                        348/E5.002
2008/0062857 A1 * 3/2008  Monogioudis ...... H04L 27/2627
                                                        370/208
(Continued)

FOREIGN PATENT DOCUMENTS

CN        1540900 A       10/2004
CN      101316254 A       12/2008
(Continued)

OTHER PUBLICATIONS

XP051039423 R1-154193 NEC,"Discussion on Implementing Superposition Transmission in LTE Downlink",3GPP TSG RAN WG1 Meeting #82,Beijing, China, Aug. 24-28, 2015,6 pages.
(Continued)

*Primary Examiner* — Mewale A Ambaye
(74) *Attorney, Agent, or Firm* — Fish & Richardson P.C.

(57) ABSTRACT

Embodiments of the present invention provide an information transmission method, including: obtaining, by a first device, N layers of symbol data sequences; performing scrambling processing on each of the N layers of symbol data sequences, to obtain a scrambled signal; and sending the scrambled signal to a second device, where N is a positive integer. Such a method for multiplexing and transmitting a plurality of layers of information based on a scrambled signal can improve a system performance gain.

16 Claims, 6 Drawing Sheets

(51) Int. Cl.
  *H04L 5/00* (2006.01)
  *H04L 27/34* (2006.01)
  *H04J 99/00* (2009.01)
(52) U.S. Cl.
  CPC .......... *H04L 1/0091* (2013.01); *H04L 1/06* (2013.01); *H04L 5/0007* (2013.01); *H04L 5/0037* (2013.01); *H04L 27/3488* (2013.01)

(56) References Cited

U.S. PATENT DOCUMENTS

| | | | |
|---|---|---|---|
| 2010/0182966 A1 | 7/2010 | Kishiyama et al. | |
| 2010/0238984 A1 | 9/2010 | Sayana et al. | |
| 2012/0076078 A1* | 3/2012 | Han | H04L 1/06 370/328 |
| 2012/0207145 A1 | 8/2012 | Han et al. | |
| 2014/0201602 A1* | 7/2014 | Eroz | H04J 11/003 714/775 |
| 2016/0269214 A1 | 9/2016 | Popovic et al. | |
| 2017/0373808 A1* | 12/2017 | Park | H04L 5/0023 |
| 2018/0220305 A1* | 8/2018 | Lei | H04L 5/0053 |
| 2019/0313392 A1* | 10/2019 | Chen | H04W 72/046 |

FOREIGN PATENT DOCUMENTS

| | | |
|---|---|---|
| CN | 101779504 A | 7/2010 |
| CN | 105359443 A | 2/2016 |
| EP | 2169864 A1 | 3/2010 |

OTHER PUBLICATIONS

XP051039342 R1-153798 Huawei, HiSilicon, "Classification of Must schemes", 3GPP TSG RAN WG1 Meeting #82 Beijing, China, Aug. 24-28, 2015, 8 pages.

Extended European Search Report issued in European Application No. 17759281.3 dated Jan. 21, 2019, 9 pages.

International Search Report and Written Opinion issued in International Application No. PCT/CN2017/075524 dated May 26, 2017, 19 pages.

Office Action issued in Chinese Application No. 201610898002.6 dated Sep. 2, 2019, 18 pages (With English Translation).

\* cited by examiner

INFORMATION TRANSMISSION METHOD AND APPARATUS

CROSS-REFERENCE TO RELATED APPLICATIONS

This application is a continuation of International Application No. PCT/CN2017/075524, filed on Mar. 3, 2017, which claims priority of Chinese Application No. 201610125223.X, filed on Mar. 4, 2016 and Chinese Application No. 201610898002.6, filed on Oct. 14, 2016, all of which are incorporated herein by reference in their entireties.

TECHNICAL FIELD

Embodiments of the present invention relate to the communications field, and more specifically, to an information transmission method and apparatus.

BACKGROUND

An orthogonal multiple access technology is widely applied to the third-generation (3G) and the fourth-generation (4G) mobile communications systems. "Orthogonal" herein means that one resource block in a system can only be allocated to at most one user for use, and manners of occupying a frequency resource by different users are "orthogonal". With continuous evolution of wireless cellular networks, the orthogonal multiple access technology has gradually failed to satisfy an increasing capacity requirement, such as mass access and continuous improvement of spectral efficiency, of people for the cellular networks. Meanwhile, a non-orthogonal multiple access technology has been attracting increasing attention from the industry and academic circles. "Non-orthogonal" means that a plurality of users can share system resources such as spectrums in a non-orthogonal manner. It is expected that a future wireless cellular network such as the fifth-generation (5G) mobile communications system can effectively improve a capacity with the help of the non-orthogonal multiple access technology.

In the non-orthogonal multiple access technology, a transmit end may superimpose, on a time-frequency resource of a system, at least two data streams that need to be sent and that are of a plurality of users for near-far matching, and then send the at least two data streams. In a non-orthogonal multiple access (NOMA) technology studied in a standard, independent encoding, modulation, and hierarchical mapping are performed on different layers of data of at least two users, different power allocation coefficients are allocated to the different layers of data, and the data is superimposed based on the power allocation coefficients and a signal is output. A receive side may alternatively implement multiuser demodulation through power allocation between a plurality of users. However, such a multiple access technology can implement multiuser detection based on only power allocation, leading to a limited application scenario and system performance gain. Especially for non-near-far users, performance of such a NOMA multiple access manner cannot be maximized.

SUMMARY

Embodiments of the present invention provide an information transmission method and apparatus, to improve a system performance gain.

According to a first aspect, an information transmission method is provided. The method includes: obtaining N layers of modulated signals that need to be transmitted to at least one terminal device, where N is a positive integer greater than or equal to 2; multiplying, on a target resource, each of the N layers of modulated signals by a linear processing coefficient corresponding to the layer, to obtain each layer of linear processing signals, and adding all layers of linear processing signals up, to obtain a superimposed output signal, where the linear processing coefficient is a complex number; and sending the superimposed output signal to the at least one terminal device by using the target resource.

In this embodiment of the present invention, a plurality of layers of signals of the at least one terminal device are separately modulated, linear processing is performed, on the target resource, on each of the N layers of modulated signals, the obtained linear processing signals are superimposed to obtain the superimposed output signal, and the superimposed output signal may be sent to the terminal device. The information transmission method can improve a system performance gain.

In an embodiment of the present invention, the information transmission method may be applied to a multiple access system, including an orthogonal multiple access system and a non-orthogonal multiple access system. The system may include a receive end and a transmit end. The information transmission method may be performed by the transmit end. The transmit end may be a network side device. For example, the transmit end may be a base station.

The "target" in the "target resource" in this embodiment of the present invention indicates a resource that is aimed at in descriptions in the embodiments, and does not imply a choice. The target resource may be a resource in actual transmission. This is not limited herein.

The linear processing coefficient may be a complex number. In this way, the modulated signals may be changed in two dimensions: an amplitude and a phase, thereby obtaining the linear processing signals.

With reference to the first aspect, in an implementation of the first aspect, a constellation diagram of the superimposed output signal includes M constellation points, where $M = \Pi_{i=1}^{N} m_i$. $m_i$ is a modulation order of an $i^{th}$ layer of modulated signals, and a probability distribution of amplitudes, phases, real parts, or imaginary parts of the M constellation points satisfies a Gaussian distribution.

It should be understood that satisfying the Gaussian distribution limited in this embodiment of the present invention may be approximately satisfying the Gaussian distribution, and an error in a particular range is allowed. When the probability distribution of the amplitudes, the phases, the real parts, or the imaginary parts of the M constellation points satisfies the Gaussian distribution, the system performance gain can be further improved.

There may be different modulation schemes for each layer of modulated signals, and a same modulation scheme may include a plurality of different constellation points. Based on this, when the linear processing coefficient is given, each layer of modulated signals may correspond to a plurality of linear processing signals, and further, there may be a plurality of superimposed output signals.

With reference to the first aspect and the foregoing implementation of the first aspect, in another implementation of the first aspect, the multiplying, on a target resource, each of the N layers of modulated signals by a linear processing coefficient corresponding to the layer, to obtain each layer of linear processing signals includes: multiplying each layer of modulated signals by the corresponding linear processing coefficient, or by the corresponding linear processing coefficient and a corresponding power allocation coefficient, to obtain each layer of linear processing signals.

In an embodiment of the present invention, when the system includes two or more terminal devices, different power allocation coefficients may be set for different terminal devices at different distances, to distinguish the different terminal devices. In this way, the terminal devices may be no longer limited by a near-far matching scenario. That is, a difference between channel quality of any two terminal devices in this embodiment of the present invention may be less than a particular channel quality threshold.

In an embodiment of the present invention, the power allocation coefficient may be determined based on a near-far characteristic of the terminal device. In addition, the power allocation coefficient is related to only a quantity of layers of data, but is not related to a resource number. In other words, power allocation coefficients of a same layer of data on different resources may be the same.

In an embodiment of the present invention, the network side device may perform linear signal processing and power allocation coefficient allocation in any order. That is, the network side device may first perform linear processing on signals, then allocate power allocation coefficients to the signals on which the linear processing has been performed, and finally output a superimposed output signal. Alternatively, the network side device may first allocate power allocation coefficients to signals, then allocate linear processing coefficients to different layers of data on different resources, and finally output a superimposed output signal.

In an embodiment of the present invention, a linear processing coefficient $\beta^i$, of an $i^{th}$ layer of modulated signals $x_{i,j}$ on a $j^{th}$ resource, where $i=1, 2, \ldots, N$, $j=1, 2, \ldots, J$, $J$ is a total quantity of resource numbers, and J is a positive integer, may be determined by using the following method: A row vector $\vec{\beta_j}=\{\beta_j^1, \beta_j^2, \ldots \beta_j^i, \ldots, \beta_j^N\}$ constituted by linear processing coefficients of all layers of signals on the $j^{th}$ resource is determined, so that an amplitude or a phase of an output signal obtained after all layers of linear processing signals on the $j^{th}$ resource are superimposed satisfies the Gaussian distribution, and $\beta_j^i$ is selected from the row vector.

Linear processing coefficients on different layers on a same resource are as follows:

$$\beta^i = \gamma \cdot e^{\sqrt{-1} \cdot \frac{i-1}{N}\pi},$$

where $i=1, 2, \ldots, N$, and $\gamma$ is a fixed value.

Linear processing coefficients on different resources may be a permutation combination of $\beta^i$ when different values are assigned to i.

In an embodiment of the present invention, the determining a row vector $\vec{\beta_j}=\{\beta_j^1, \beta_j^2, \ldots \beta_j^i, \ldots, \beta_j^N\}$ constituted by linear processing coefficients of all layers of signals on the $j^{th}$ resource includes: determining N elements in the row vector, obtaining M vectors based on the N elements, where M=N!, selecting one vector from the M vectors as the row vector, so that the amplitude or the phase of the output signal obtained after all the layers of linear processing signals on the $j^{th}$ resource are superimposed satisfies the Gaussian distribution.

Optionally, in an embodiment of the present invention, one vector may be selected, in the following manner, from the M vectors as the row vector corresponding to the $j^{th}$ resource: predefining a vector $\vec{\beta}$, where $\vec{\beta}$ includes the N elements in the row vector, and determining, based on the vector $\vec{\beta}$ and a predefined random selection rule, the row vector $\vec{\beta_j}$, corresponding to the $j^{th}$ resource. For example, it is assumed that the M vectors obtained by using the N elements are denoted as $\vec{\beta_1}, \vec{\beta_2}, \ldots,$ and $\vec{\beta_M}$, and the random selection rule may be $\vec{\beta_j}=\vec{\beta_m}$, where m may be a value randomly selected from [0, M−1].

Optionally, in another embodiment of the embodiments of the present invention, one vector may alternatively be selected, in the following manner, from the M vectors as the row vector corresponding to the $j^{th}$ resource: predefining a vector $\vec{\beta}$, where $\vec{\beta}$ includes the N elements in the row vector, and determining, based on a relationship between the vector $\vec{\beta}$ and the resource number j, the row vector $\vec{\beta_j}$ corresponding to the $j^{th}$ resource. For example, it is assumed that the M vectors obtained by using the N elements are denoted as $\vec{\beta_1}, \vec{\beta_2}, \ldots,$ and $\vec{\beta_M}$ and a random selection rule may be $\vec{\beta_j}=\vec{\beta_m}$ where m may be obtained based on a modulo operation of j and M.

In an embodiment of the present invention, the superimposed output signal of all layers of output signals on the $j^{th}$ resource is $$x_j = \sum_{i=1}^{N} \partial_i \beta_j^i \cdot x_{i,j}.$$

A sum of superimposed output signals output on all resources is $X=[x_1, x_2, \ldots x_j, \ldots, x_J]$.

Signals obtained after power is allocated to a plurality of layers of data may be output on different resources. For example, an output signal on a resource element (RE) corresponding to the resource number j may be $$x_j = \sum_{i=1}^{N} \partial_i g \beta_j^i g x_{i,j}.$$

In an embodiment of the present invention, determining N layers of data of the at least one terminal device may be implemented in the following manner: obtaining at least one transport block (TB) of the at least one terminal device, and performing serial-to-parallel conversion on data obtained after the at least one transport block is encoded, to obtain the N layers of data.

In an embodiment of the present invention, the N layers of data may be for a same terminal device, or may be for different terminal devices. The N layers of data may be obtained by using a same transport block of a same terminal device, or may be obtained by using different transport blocks of a same terminal device. For example, the N layers of data may be obtained through serial-to-parallel conversion after a same transport block of a same terminal device is encoded, or may be obtained through serial-to-parallel conversion after different transport blocks of a same terminal device are encoded, or may be obtained through serialto-parallel conversion after different transport blocks of different terminal devices are encoded.

With reference to the first aspect and the foregoing implementations of the first aspect, in another implementation of the first aspect, the at least one terminal device includes a first terminal device and a second terminal device. An absolute value of a difference between channel quality of the first terminal device and channel quality of the second terminal device is less than a channel quality threshold, where the channel quality threshold is a positive integer.

When an absolute value of a difference between channel quality of two terminal devices is greater than or equal to the channel quality threshold, the two terminal devices are considered as near-far matching users. When an absolute value of a difference between channel quality of two terminal devices is less than the channel quality threshold, the two terminal devices may be considered as non-near-far matching users. This embodiment of the present invention may be not limited to distances of terminal devices.

In this embodiment of the present invention, for users with different channel quality, when linear processing is performed on modulated signals, an operation of allocating power allocation coefficients may be added. In this way, distinguishing degrees of signals of the users with the different channel quality in the output signal may be further improved. In other words, near-far matching users may be further distinguished by allocating power allocation coefficients.

In an embodiment of the present invention, if there is one terminal device, linear processing coefficients of a same layer of modulated signals on different resources may be the same or different.

In an embodiment of the present invention, if there is more than one terminal device, linear processing coefficients of a same layer of modulated signals on different resources are different.

When all layers of modulated signals are for a same terminal device, that is, information of a single user is transmitted, linear processing coefficients of a same layer of modulated signals on different resources are the same or different. When the N layers of modulated signals are from different terminal devices, that is, information of a plurality of users is transmitted, linear processing coefficients of a same layer of modulated signals on different resources are different.

In an embodiment of the present invention, the network side device may further send, to the terminal device, a quantity N of layers of the data, a modulation and coding scheme (MCS) for each layer of data, a layer number i of the data that is obtained by using a transport block of the terminal device, so that after receiving a signal from the network side device, the terminal device decodes the received signal based on N, the MCS, and i. A method used by the terminal device to decode the received signal based on N, the MCS, and i may be performed according to a method in the prior art.

According to a second aspect, an information transmission method is provided. The method includes: receiving, by using a target resource, a superimposed output signal from a network side device, where the superimposed output signal is a sum of each of N layers of modulated signals multiplied by a linear processing coefficient corresponding to the layer, the linear processing coefficient is a complex number, and N is a positive integer greater than or equal to 2; and demodulating the superimposed output signal based on the linear processing coefficient of each layer of modulated signals.

With reference to the second aspect, in an implementation of the second aspect, a constellation diagram of the superimposed output signal includes M constellation points, where $M=\Pi_{i=1}^{N} m_i$, $m_i$ is a modulation order of an $i^{th}$ layer of modulated signals, and a probability distribution of amplitudes, phases, real parts, or imaginary parts of the M constellation points satisfies a Gaussian distribution.

With reference to the second aspect and the foregoing implementation of the second aspect, in another implementation of the second aspect, the demodulating the superimposed output signal based on the linear processing coefficient of each layer of modulated signals includes: demodulating the superimposed output signal based on the linear processing coefficient of each layer of modulated signals or based on the corresponding linear processing coefficient and a corresponding power allocation coefficient.

With reference to the second aspect and the foregoing implementations of the second aspect, in another implementation of the second aspect, the method is performed by at least a first terminal device and a second terminal device. An absolute value of a difference between channel quality of the first terminal device and channel quality of the second terminal device is less than a channel quality threshold, where the channel quality threshold is a positive integer.

In an embodiment of the present invention, if there is one terminal device, linear processing coefficients of a same layer of modulated signals on different resources may be the same or different.

In an embodiment of the present invention, if there is more than one terminal device, linear processing coefficients of a same layer of modulated signals on different resources are different.

According to a third aspect, an information transmission apparatus is provided. The apparatus includes: an obtaining unit, configured to obtain N layers of modulated signals that need to be transmitted to at least one terminal device, where N is a positive integer greater than or equal to 2; a processing unit, configured to: multiply, on a target resource, each layer of modulated signals, obtained by the obtaining unit, by a linear processing coefficient corresponding to the layer, to obtain each layer of linear processing signals, and add all layers of linear processing signals up, to obtain a superimposed output signal, where the linear processing coefficient is a complex number; and a sending unit, configured to send, by using the target resource, the superimposed output signal obtained by the processing unit to the at least one terminal device.

With reference to the third aspect, in an implementation of the third aspect, a constellation diagram of the superimposed output signal includes M constellation points, where $M=\Pi_{i=1}^{N} m_i$, $m_i$ is a modulation order of an $i^{th}$ layer of modulated signals, and a probability distribution of amplitudes, phases, real parts, or imaginary parts of the M constellation points satisfies a Gaussian distribution.

With reference to the third aspect and the foregoing implementations of the third aspect, in another implementation of the third aspect, that the processing unit is configured to multiply, on a target resource, each layer of modulated signals, obtained by the obtaining unit, by corresponding linear processing coefficients, to obtain each layer of linear processing signals includes: the processing unit is configured to multiply each layer of modulated signals by the linear processing coefficient corresponding to the layer, or by the corresponding linear processing coefficient and a corresponding power allocation coefficient, to obtain each layer of linear processing signals.

With reference to the third aspect and the foregoing implementations of the third aspect, in another implementation of the third aspect, the at least one terminal device includes a first terminal device and a second terminal device. An absolute value of a difference between channel quality of the first terminal device and channel quality of the second terminal device is less than a channel quality threshold, where the channel quality threshold is a positive integer.

The information transmission apparatus according to the third aspect may be configured to perform the method according to the first aspect or any possible implementation of the first aspect. Specifically, the apparatus includes the units configured to perform the method according to the first aspect or any possible implementation of the first aspect.

According to a fourth aspect, an information transmission apparatus is provided. The apparatus includes: a receiving unit, configured to receive, by using a target resource, a superimposed output signal from a network side device, where the superimposed output signal is a sum of each of N layers of modulated signals multiplied by a linear processing coefficient corresponding to the layer, the linear processing coefficient is a complex number, and N is a positive integer greater than or equal to 2; and a demodulation unit, configured to demodulate, based on the linear processing coefficient of each layer of modulated signals, the superimposed output signal obtained by the receiving unit.

With reference to the fourth aspect, in an implementation of the fourth aspect, a constellation diagram of the superimposed output signal includes M constellation points, where $M=\Pi_{i=1}^{N}m_i$, $m_i$ is a modulation order of an $i^{th}$ layer of modulated signals, and a probability distribution of amplitudes, phases, real parts, or imaginary parts of the M constellation points satisfies a Gaussian distribution.

With reference to the fourth aspect and the foregoing implementation of the fourth aspect, in another implementation of the fourth aspect, that the demodulation unit is configured to demodulate, based on the linear processing coefficient of each layer of modulated signals, the superimposed output signal obtained by the receiving unit includes: the demodulation unit is configured to demodulate the superimposed output signal based on the linear processing coefficient of each layer of modulated signals or based on the linear processing coefficient and a power allocation coefficient.

With reference to the fourth aspect and the foregoing implementations of the fourth aspect, in another implementation of the fourth aspect, the apparatus includes at least a first terminal device and a second terminal device. An absolute value of a difference between channel quality of the first terminal device and channel quality of the second terminal device is less than a channel quality threshold, where the channel quality threshold is a positive integer.

The information transmission apparatus according to the fourth aspect may be configured to perform the method according to the second aspect or any possible implementation of the second aspect. Specifically, the apparatus includes the units configured to perform the method according to the second aspect or any possible implementation of the second aspect.

In all of the foregoing embodiments of the present invention, N is a total quantity of layers of the data, and J is a total quantity of resource numbers.

The information transmission method in the embodiments of the present invention may be applied to a soft multiplexing multiple access (SMMA) technology. The SMMA technology may be understood as that when information is being transmitted, after data is modulated and mapped, linear processing is performed on different layers of data on different resources, so that a probability distribution of an amplitude or a phase of a superimposed output signal obtained after all layers of linear processing signals on a same resource are superimposed satisfies a Gaussian distribution. Certainly, a person skilled in the art may not refer to the technology as SMMA, and may alternatively refer to the technology as another technical name.

In this embodiment of the present invention, in the SMMA technology, an operation of performing linear processing on modulated signals is added, so that the probability distribution of the amplitude or the phase of the superimposed output signal obtained after all the layers of linear processing signals on a same resource are superimposed satisfies the Gaussian distribution, thereby improving a system performance gain.

A sparse code multiple access (SCMA) technology is another typical non-orthogonal multiple access and transmission technology. In the SCMA technology, independent encoding, sparse code modulation, and hierarchical mapping may be performed on different layers of data of different users, different power allocation coefficients are allocated to the different layers of data, the data is superimposed based on the power allocation coefficients, and a signal is output. The essence of the SCMA technology is spreading. That is, before information is transmitted, linear spectrum widening processing is first performed on a transmitted signal, to obtain a relatively strong anti-interference capability and a relatively high transmission rate by using a wide spectrum. However, when a code rate is relatively high, a spreading gain is smaller than an encoding gain in a case of a same code rate, leading to a limited system performance gain in a high code rate scenario in the SCMA technology. Compared with the SCMA technology, in the SMMA technology in this embodiment of the present invention, a system can obtain a shaping gain, thereby further improving the system performance gain.

Compared with a NOMA technology, in the SMMA technology in this embodiment of the present invention, linear processing includes linear processing performed on the modulated signals based on the power allocation coefficient. In this way, it can be ensured that near-far matching users are no longer limited to a user matching scenario. That is, in the SMMA technology, no limit is imposed on the channel quality of the terminal device, and any terminal device can use the SMMA technology to transmit information.

According to a fifth aspect, an information transmission system is provided. The system includes the information transmission apparatus according to the third aspect and the information transmission apparatus according to the fourth aspect.

According to a sixth aspect, an information transmission method is provided. The method includes: obtaining, by a first device, N layers of symbol data sequences, where N is a positive integer; performing, by the first device, scrambling processing on each of the N layers of symbol data sequences, to obtain a scrambled signal; and sending, by the first device, the scrambled signal to a second device.

In this embodiment of the present invention, scrambling processing is performed on each layer of symbol data sequence, a scrambled signal is obtained based on a processing result, and the scrambled signal is sent to another device so that the another device demodulates the scrambled signal. Such an information transmission method in which multiuser detection is implemented based on scrambling processing can improve a system performance gain.

In an embodiment of the present invention, the N layers of symbol data sequences may be generated by the first device.

With reference to the sixth aspect, in an implementation of the sixth aspect, when N>1, the performing, by the first device, scrambling processing on each of the N layers of symbol data sequences, to obtain a scrambled signal includes: performing, by the first device, scrambling processing on the N layers of symbol data sequences separately, to obtain N layers of scrambled symbol data signals; and superimposing, by the first device, the N layers of scrambled symbol data signals, to obtain a final scrambled signal.

In an embodiment of the present invention, when N=1, after performing scrambling processing on the symbol data sequences to obtain the scrambled signal, the first device may directly send the scrambled signal to the second device, with no need to perform N-layer superimposition.

With reference to the sixth aspect and the foregoing implementation of the sixth aspect, in another implementation of the sixth aspect, the performing, by the first device, scrambling processing on each of the N layers of symbol data sequences includes: determining, by the first device, a scrambling sequence corresponding to each layer of symbol data sequence; and multiplying, by the first device, a scrambling coefficient in the scrambling sequence by symbol data in a corresponding symbol data sequence.

With reference to the sixth aspect and the foregoing implementations of the sixth aspect, in another implementation of the sixth aspect, assuming that a length of the scrambling sequence is Q, and a data selection index of the symbol data sequences is j, a coefficient selection index q of the scrambling sequence satisfies a modulo operation q=j%Q, where the coefficient selection index q of the scrambling sequence is used to indicate the scrambling coefficient in the scrambling sequence, and the data selection index j of the symbol data sequences is used to indicate the symbol data in the symbol data sequence.

The length of the sequence in this embodiment of the present invention refers to a quantity of elements in the sequence. For example, the length Q of the scrambling sequence means that the scrambling sequence includes Q scrambling coefficients.

With reference to the sixth aspect and the foregoing implementations of the sixth aspect, in another implementation of the sixth aspect, the determining, by the first device, a scrambling sequence corresponding to each layer of symbol data sequence includes: determining N scrambling sequence selection indexes based on a quantity N of layers of the symbol data sequences, where each layer of symbol data sequence corresponds to one scrambling sequence selection index, and each scrambling sequence selection index corresponds to one scrambling sequence; and selecting, from a predefined scrambling sequence set, a scrambling sequence corresponding to each scrambling sequence selection index.

With reference to the sixth aspect and the foregoing implementations of the sixth aspect, in another implementation of the sixth aspect, when N>1, at least two of the N scrambling sequence selection indexes are different.

When scrambling sequence selection indexes of a plurality of layers of symbol data sequences are the same, the plurality of layers of symbol data sequences correspond to a same scrambling sequence. In this case, another dimension, for example, a power dimension, needs to be added to distinguish different layers of symbol data sequences.

With reference to the sixth aspect and the foregoing implementations of the sixth aspect, in another implementation of the sixth aspect, the determining N scrambling sequence selection indexes based on a quantity N of layers of the symbol data sequences includes: receiving, by the first device, the N scrambling sequence selection indexes indicated by the second device; or randomly determining, by the first device, the N scrambling sequence selection indexes based on a number value of the first device and a size P of the predefined scrambling sequence set; or sequentially and circularly selecting, by the first device, the N scrambling sequence selection indexes based on a size P of the predefined scrambling sequence set, where P is a positive integer greater than or equal to N.

In an embodiment of the present invention, each first device may have a number value. A different number value of a first device may correspond to a different scrambling sequence selection index. In other words, a scrambling sequence selection index corresponding to a number value of a first device may be selected from the predefined scrambling sequence set based on the number value.

In an embodiment of the present invention, when the first device is user equipment, and the second device is a base station, the base station may perform scheduling. For example, the base station may determine the N scrambling sequence selection indexes, and send the N scrambling sequence selection indexes to the user equipment.

In an embodiment of the present invention, when the first device is user equipment, and the second device is a base station, the user equipment may further determine the N scrambling sequence selection indexes based on a number value of the user equipment and the size of the predefined scrambling sequence set.

With reference to the sixth aspect and the foregoing implementations of the sixth aspect, in another implementation of the sixth aspect, the method further includes: obtaining, by the first device, a base sequence having a length of P, where P is a positive integer, and P≥2; performing, by the first device, full permutation on elements in the base sequence, to obtain Q sequences, where Q satisfies Q=P!; and constructing, by the first device, a scrambling matrix of P rows and Q columns based on the Q sequences, where each row in the scrambling matrix constitutes one scrambling sequence, a set constituted by P scrambling sequences is the scrambling sequence set, and selection indexes of the P scrambling sequences are integers from 0 to P−1.

With reference to the sixth aspect and the foregoing implementations of the sixth aspect, in another implementation of the sixth aspect, N is determined by the first device, or N is carried in indication information of the second device, or N is predefined.

In an embodiment of the present invention, each of the N scrambling sequence selection indexes may be any one of the selection indexes of the P scrambling sequences.

In this embodiment of the present invention, the first device may be a network side device or user equipment. For example, the first device and the second device are a network side device and user equipment respectively.

In this embodiment of the present invention, the size of the scrambling sequence set refers to a quantity of scrambling sequences in a set constituted by a plurality of scrambling sequences.

According to a seventh aspect, an information transmission method is provided. The method includes: receiving, by a second device, a scrambled signal from a first device, where the scrambled signal is obtained by the first device by performing scrambling processing on each of obtained N layers of symbol data sequences, and N is a positive integer; and demodulating, by the second device, the scrambled signal.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

With reference to the seventh aspect, in an implementation of the seventh aspect, the method further includes: determining, by the second device, a quantity N of superimposed layers of the symbol data sequences; and randomly determining, by the second device, scrambling sequence selection indexes respectively corresponding to the N layers of symbol data sequences. The demodulating, by the second device, the scrambled signal includes: demodulating, by the second device, the scrambled signal based on the scrambling sequence selection indexes respectively corresponding to the N layers of symbol data sequences.

With reference to the seventh aspect and the foregoing implementation of the seventh aspect, in another implementation of the seventh aspect, the determining, by the second device, a quantity N of superimposed layers of the symbol data sequences includes: receiving, by the second device, the quantity N of superimposed layers of the symbol data sequences from the first device; or obtaining, by the second device, a predefined maximum quantity of superimposed layers and using the maximum quantity of superimposed layers as the quantity N of superimposed layers of the symbol data sequences.

With reference to the seventh aspect and the foregoing implementations of the seventh aspect, in another implementation of the seventh aspect, assuming that a length of the scrambling sequence is Q, and a data selection index of the symbol data sequences is j, a coefficient selection index q of the scrambling sequence satisfies a modulo operation $q=j\%Q$, where the coefficient selection index q of the scrambling sequence is used to indicate the scrambling coefficient in the scrambling sequence, and the data selection index j of the symbol data sequences is used to indicate the symbol data in the symbol data sequence.

With reference to the seventh aspect and the foregoing implementations of the seventh aspect, in another implementation of the seventh aspect, when N>1, the scrambled signal is superposition of N layers of scrambled symbol data signals, and each layer of scrambled symbol data signals is obtained by the first device by performing scrambling processing on a corresponding layer of symbol data sequence.

With reference to the seventh aspect and the foregoing implementations of the seventh aspect, in another implementation of the seventh aspect, the method further includes: sending, by the second device, N scrambling sequence selection indexes to the first device, where each layer of symbol data sequence corresponds to one scrambling sequence selection index.

Beneficial effects of the steps in the seventh aspect are the same as beneficial effects of corresponding steps in the sixth aspect. To avoid repetition, details are not described herein again.

According to an eighth aspect, an information transmission apparatus is provided, including: a first obtaining unit, configured to obtain N layers of symbol data sequences, where N is a positive integer; a processing unit, configured to perform scrambling processing on each of the N layers of symbol data sequences obtained by the first obtaining unit, to obtain a scrambled signal; and a sending unit, configured to send the scrambled signal to a second device.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

With reference to the eighth aspect, in an implementation of the eighth aspect, when N>1, the processing unit is specifically configured to: perform scrambling processing on the N layers of symbol data sequences separately, to obtain N layers of scrambled symbol data signals; and superimpose the N layers of scrambled symbol data signals, to obtain a final scrambled signal.

With reference to the eighth aspect and the foregoing implementation of the eighth aspect, in another implementation of the eighth aspect, the processing unit is specifically configured to: determine a scrambling sequence corresponding to each layer of symbol data sequence; and multiply a scrambling coefficient in the scrambling sequence by symbol data in a corresponding symbol data sequence.

With reference to the eighth aspect and the foregoing implementations of the eighth aspect, in another implementation of the eighth aspect, assuming that a length of the scrambling sequence is Q, and a data selection index of the symbol data sequences is j, a coefficient selection index q of the scrambling sequence satisfies a modulo operation $q=j\%Q$, where the coefficient selection index q of the scrambling sequence is used to indicate the scrambling coefficient in the scrambling sequence, and the data selection index j of the symbol data sequences is used to indicate the symbol data in the symbol data sequence.

With reference to the eighth aspect and the foregoing implementations of the eighth aspect, in another implementation of the eighth aspect, the processing unit is specifically configured to: determine N scrambling sequence selection indexes based on a quantity N of layers of the symbol data sequences; and select, from a predefined scrambling sequence set, a scrambling sequence corresponding to each scrambling sequence selection index, where each layer of symbol data sequence corresponds to one scrambling sequence selection index, and each scrambling sequence selection index corresponds to one scrambling sequence.

With reference to the eighth aspect and the foregoing implementations of the eighth aspect, in another implementation of the eighth aspect, when N>1, at least two of the N scrambling sequence selection indexes are different.

With reference to the eighth aspect and the foregoing implementations of the eighth aspect, in another implementation of the eighth aspect, the apparatus further includes a receiving unit. The receiving unit is specifically configured to receive the N scrambling sequence selection indexes indicated by the second device. Alternatively, the processing unit is specifically configured to randomly determine the N scrambling sequence selection indexes based on a number value of the first device and a size P of the predefined scrambling sequence set; or the processing unit is specifically configured to sequentially and circularly select the N scrambling sequence selection indexes based on a size P of the predefined scrambling sequence set, where P is a positive integer greater than or equal to N.

With reference to the eighth aspect and the foregoing implementations of the eighth aspect, in another implementation of the eighth aspect, the apparatus further includes a second obtaining unit. The second obtaining unit is specifically configured to obtain a base sequence having a length of P, where P is a positive integer, and P≥2. The processing unit is further configured to: perform full permutation on elements in the base sequence, to obtain Q sequences; and construct a scrambling matrix of P rows and Q columns based on the Q sequences, where Q satisfies Q=P!. Each row in the scrambling matrix constitutes one scrambling sequence, a set constituted by P scrambling sequences is the scrambling sequence set, and selection indexes of the P scrambling sequences are integers from 0 to P−1.

The information transmission apparatus according to the eighth aspect may be configured to perform the method according to the sixth aspect or any possible implementation of the sixth aspect. Specifically, the apparatus includes the units configured to perform the method according to the sixth aspect or any possible implementation of the sixth aspect. Beneficial effects of the units also correspond to the beneficial effects of the corresponding steps in the sixth aspect. To avoid repetition, details are not described herein again.

According to a ninth aspect, an information transmission apparatus is provided, including: a first receiving unit, configured to receive a scrambled signal from a first device, where the scrambled signal is obtained by the first device by performing scrambling processing on each of obtained N layers of symbol data sequences, and N is a positive integer; and a demodulation unit, configured to demodulate the scrambled signal received by the first receiving unit.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

With reference to the ninth aspect, in an implementation of the ninth aspect, the apparatus further includes a determining unit, configured to determine a quantity N of superimposed layers of the symbol data sequences and scrambling sequence selection indexes respectively corresponding to the N layers of symbol data sequences. The demodulation unit is specifically configured to demodulate the scrambled signal based on the scrambling sequence selection indexes respectively corresponding to the N layers of symbol data sequences.

With reference to the ninth aspect and the foregoing implementation of the ninth aspect, in another implementation of the ninth aspect, the apparatus further includes a second receiving unit. The second receiving unit is configured to receive the quantity N of superimposed layers of the symbol data sequences from the first device. Alternatively, the determining unit is configured to: obtain a predefined maximum quantity of superimposed layers and use the maximum quantity of superimposed layers as the quantity N of superimposed layers of the symbol data sequences.

With reference to the ninth aspect and the foregoing implementations of the ninth aspect, in another implementation of the ninth aspect, assuming that a length of the scrambling sequence is Q, and a data selection index of the symbol data sequences is j, a coefficient selection index q of the scrambling sequence satisfies a modulo operation q=j%Q, where the coefficient selection index q of the scrambling sequence is used to indicate the scrambling coefficient in the scrambling sequence, and the data selection index j of the symbol data sequences is used to indicate the symbol data in the symbol data sequence.

With reference to the ninth aspect and the foregoing implementations of the ninth aspect, in another implementation of the ninth aspect, when N>1, the scrambled signal is superimposition of N layers of scrambled symbol data signals, and each layer of scrambled symbol data signals is obtained by the first device by performing scrambling processing on a corresponding layer of symbol data sequence.

With reference to the ninth aspect and the foregoing implementations of the ninth aspect, in another implementation of the ninth aspect, the apparatus further includes a sending unit, configured to send N scrambling sequence selection indexes to the first device, where each layer of symbol data sequence corresponds to one scrambling sequence selection index.

The information transmission apparatus according to the ninth aspect may be configured to perform the method according to the seventh aspect or any possible implementation of the seventh aspect. Specifically, the apparatus includes the units configured to perform the method according to the seventh aspect or any possible implementation of the seventh aspect. Beneficial effects of the units also correspond to beneficial effects of corresponding steps in the seventh aspect. To avoid repetition, details are not described herein again.

DESCRIPTION OF EMBODIMENTS

The following describes the technical solutions in the embodiments of the present invention with reference to the accompanying drawings in the embodiments of the present invention.

It should be understood that the technical solutions in the embodiments of the present invention may be applied to a multi-carrier transmission system using a non-orthogonal multiple access technology, for example, an orthogonal frequency division multiplexing (OFDM) system, a filter bank multi-carrier (FBMC) system, a generalized frequency division multiplexing (GFDM) system, and a filtered orthogonal frequency division multiplexing (Filtered-OFDM, F-OFDM) system using the non-orthogonal multiple access technology. It should be also understood that in the embodiments of the present invention, a communications system using an SMMA technology is only used as an example for description, but the embodiments of the present invention are not limited thereto.

Figure 1:
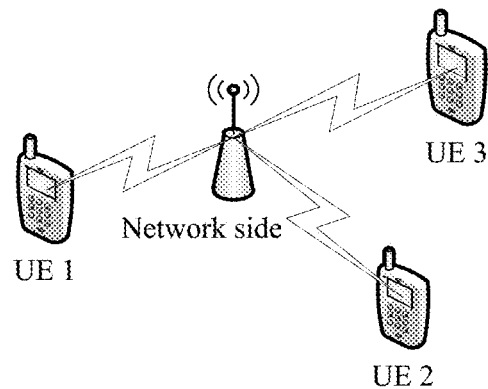
FIG. 1 is a schematic diagram of a scenario to which a communications system in embodiments of the present invention can be applied.

FIG. 1 is a schematic diagram of a scenario to which a communications system in the embodiments of the present invention can be applied.

The communications system shown in FIG. 1 may include a network side device 101 and a plurality of terminal devices. For example, three terminal devices 102, 103, and 104 are shown in FIG. 1. The network side device may be a wireless communications sending apparatus and/or a wireless communications receiving apparatus. The terminal device may also be a wireless communications sending apparatus and/or a wireless communications receiving apparatus. When sending data, the wireless communications sending apparatus may encode, modulate, and map the data for transmission. Specifically, the wireless communications sending apparatus may obtain a particular quantity of data bits to be sent, by using a channel, to the wireless communications receiving apparatus. Such data bits may be included in a transport block of the data.

In the embodiments of the present invention, the terminal device may communicate with one or more core networks by using a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another linear processing device connected to a wireless modem, an in-vehicle device, a wearable device, or a terminal device in a future 5G network.

The embodiments of the present invention may be applicable to information transmission in a plurality of communications scenarios, such as device to device (D2D) information transmission, machine to machine (M2M) information transmission, or information transmission in a macro/micro communications scenario.

In the embodiments of the present invention, the network side device may be configured to communicate with the terminal device. The network side device may be a base transceiver station (BTS) in a Global System for Mobile Communications (SM) or in Code Division Multiple Access (CDMA), a NodeB (NB) in a Wideband Code Division Multiple Access (WCDMA) system, or an evolved NodeB (eNB, or eNodeB) in a Long Term Evolution (LTE) system. Alternatively, the network device may be a relay station, an access point, an in-vehicle device, a wearable device, a base station device in a further 5G network, and the like.

In an embodiment of the present invention, a base station may communicate with a plurality of UEs over an air interface by using a non-orthogonal multiple access technology. When the plurality of UEs communicate with the base station, the plurality of UEs may use a same time-frequency resource. In non-orthogonal air-interface-based access, a plurality of codewords are allowed to be superimposed and transmitted on one resource. One resource may be defined as a resource element that is jointly defined in at least two dimensions such as a symbol in a time domain, a subcarrier in a frequency domain, and an antenna port in a spatial domain.

The communications system in the embodiments of the present invention may be a multiple access system. For example, the system is an SMMA system. The network side device is, for example, a base station, and the terminal device is, for example, a terminal device. In the embodiments of the present invention, the SMMA system, the base station, and the terminal device are only used as an example for description, but the embodiments of the present invention are not limited thereto.

Figure 2:
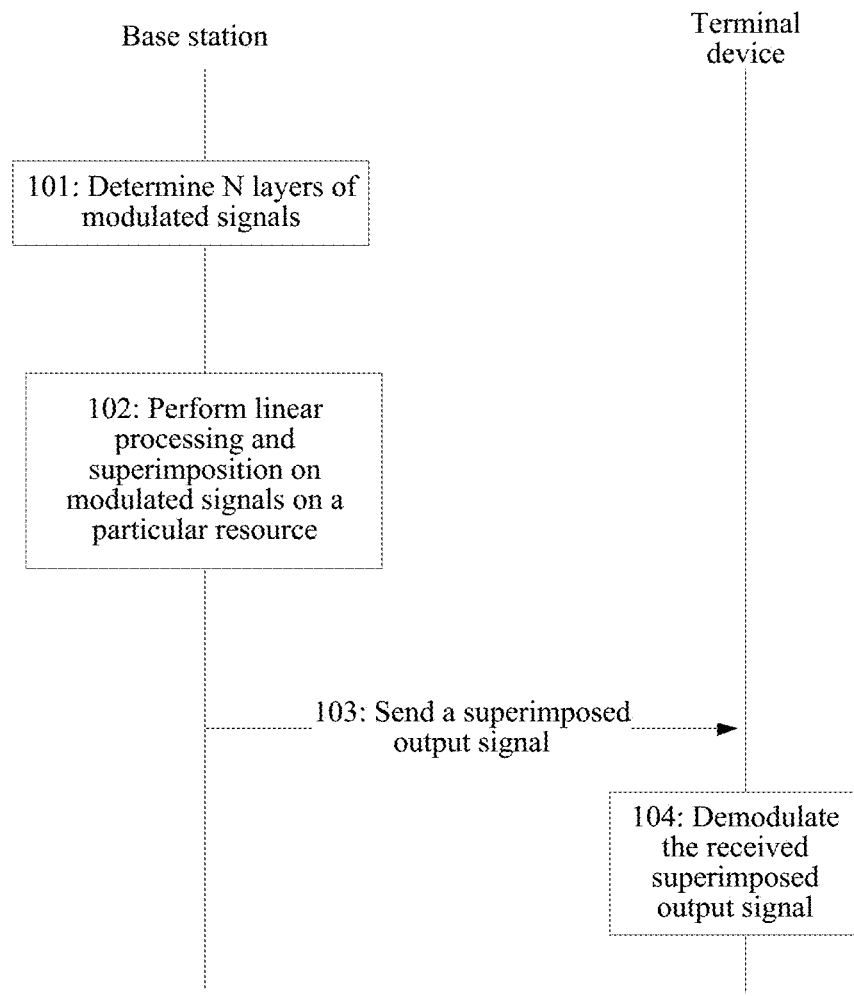
FIG. 2 is a schematic flowchart of an information transmission method according to an embodiment of the present invention.

FIG. 2 is a schematic flowchart of an information transmission method according to an embodiment of the present invention.

101: A base station determines N layers of modulated signals.

The base station may determine the N layers of modulated signals, where N is a total quantity of layers of transmitted data, and N is a positive integer greater than or equal to 2. For example, N may be obtained based on information reported by a terminal device to the base station.

Herein, the N layers of modulated signals may be for a same terminal device, or may be for a plurality of terminal devices. The modulated signals are obtained through modulation and mapping after encoding and serial-to-parallel conversion are performed on a transport block of the terminal device. The N layers of modulated signals may be obtained through modulation and mapping after serial-to-parallel conversion is performed on transport blocks of a same terminal device, or may be obtained through modulation and mapping after serial-to-parallel conversion is performed on transport blocks of different terminal devices. There may be one or more transport blocks. Provided that there is one transport block, a plurality of layers of modulated signals can be obtained through serial-to-parallel conversion.

The base station modulates and maps bit sequences of each layer of data, so that each layer of bit sequences can be mapped to different resources. That is, on any resource, there are modulated signals obtained after different layers of bit sequences are mapped, thereby obtaining modulated signals $x_{i,j}$ for an $i^{th}$ layer of bit sequences on a resource j, where i=1, 2, . . . , N, j=1, 2, . . . , J, J is total quantity of resource numbers, and J is a positive integer.

102: The base station performs linear processing and superimposition on modulated signals on a particular resource, to obtain a superimposed output signal.

The base station may perform linear processing on each of the N layers of modulated signals on different resources, to obtain linear processing signals of each layer of modulated signals on the different resources. Herein, that the base station processes modulated signals only on a specified resource (for example, a target resource) is used as an example for description. Processing on another resource is the same as processing on the specified resource, and details are not described herein again.

The base station may perform linear processing on each layer of modulated signals on the specified resource, to obtain each layer of linear processing signals, and adds all layers of linear processing signals up, to obtain a superimposed output signal. Each layer of modulated signals may correspond to different constellation points, and a plurality of superimposed output signals may be obtained through linear processing and superimposition. When a probability distribution of amplitudes or phases of the plurality of superimposed output signals satisfies a Gaussian distribution, a system performance gain can be further improved.

For example, the base station may first obtain a linear processing coefficient $\beta_j^i$ of an $i^{th}$ layer of data on the $j^{th}$ resource, where i=1, 2, . . . , N, and j is a positive integer. When the $j^{th}$ resource is a specified resource, there may be N values for the linear processing coefficient $\beta_j^i$. The N linear processing coefficients may be empirical values. Linear processing is performed on different layers of modulated signals on the specified resource by using a row vector consisting of the N linear processing coefficients. Then, $\beta_j^i$ is selected from the determined row vector as a coefficient for performing linear preprocessing on the $i^{th}$ layer of modulated signals on the $j^{th}$ resource, where $\beta_j^i$ is an $i^{th}$ element in the row vector.

In an embodiment of the present invention, the base station may determine a superimposing coefficient vector group based on the N linear processing coefficients. The vector group has M elements, where M=N!. Each element in the vector group is a row vector. Different elements (that is, different row vectors) in the vector group correspond to different arrangements of the N linear processing coefficients. The base station may select, based on the vector group, a row vector constituted by linear preprocessing coefficients obtained when all layers of data are transmitted on the $j^{th}$ resource. For example, a row vector corresponding to the $j^{th}$ resource herein may be a vector element randomly selected from the vector group according to a particular rule, or may be selected based on a relationship between the resource number j and M, for example, may be obtained based on a modulo operation of j and M.

After determining the linear processing coefficient $\beta_j^i$ obtained when the $i^{th}$ layer of modulated signals is transmitted on the specified resource (for example, the $j^{th}$ resource), the base station may perform, based on $\beta_j^i$, linear processing on a mapping sequence $x_{i,j}$ of the $i^{th}$ layer of modulated signals on the $j^{th}$ resource, to obtain linear processing signals $\beta_j^i \cdot x_{i,j}$ of the $i^{th}$ layer of modulated signals on the $j^{th}$ resource.

After obtaining all layers of linear processing signals on the specified resource, the base station may superimpose all the layers of linear processing signals, to obtain the superimposed output signal.

After obtaining linear processing signals of different layers of modulated signals on different resources, the base station may determine power allocation coefficients of the different layers of modulated signals, allocate the power allocation coefficients to different layers of linear processing signals on the different resources, and superimpose the different layers of linear processing signals based on the power allocation coefficients, to obtain the superimposed output signal. For example, based on a power allocation coefficient $\alpha_i$ of the $i^{th}$ layer of modulated signals on the $j^{th}$ resource, it may be determined that an output signal obtained when all the layers of signals are transmitted on the $j^{th}$ resource is $$x_j = \sum_{i=1}^{N} \alpha_i \cdot \beta_j^i \cdot x_{i,j}.$$

The base station may further determine, based on output signals when different values are assigned to j, that a superimposed output signal obtained when all the layers of signals are transmitted on all the resources is $X=[x_1, x_2, \ldots x_j, \ldots, x_J]$, where J is a total quantity of resource numbers.

The power allocation coefficient herein may be determined according to a method used in a NOMA technology or an SCMA technology, or may be determined in another manner. This is not limited herein. For example, the power allocation coefficient may be set based on a near-far characteristic of the terminal device.

In an embodiment of the present invention, the base station may perform linear processing and superimposition on the modulated signals in a plurality of manners, to obtain the superimposed output signal.

For example, the base station may process and superimpose different layers of modulated signals based on only the linear processing coefficient, to obtain the superimposed output signal.

For another example, alternatively, the base station may process and superimpose different layers of modulated signals based on the linear processing coefficient and the power allocation coefficient, to obtain the superimposed output signal. In this way, distances of different terminal devices may be no longer limited by adding a power allocation coefficient.

In an embodiment of the present invention, the network side device may perform linear signal preprocessing and power allocation coefficient allocation in any order. That is, the network side device may first perform linear processing on signals, then allocate power allocation coefficients to the signals on which the linear processing has been performed, and finally output a superimposed output signal. Alternatively, the network side device may first allocate power allocation coefficients to signals, then allocate linear processing coefficients to different layers of data on different resources, and finally output a superimposed output signal.

When linear processing is performed on different layers of modulated signals to obtain different amplitudes or phases of different layers of linear processing signals, it can be ensured that a receive end correctly demodulates the different layers of data. In this way, channel quality of a terminal device is no longer limited. That is, the terminal device is no longer limited by a near-far matching scenario.

103: The base station sends the superimposed output signal to a terminal device.

The base station may send the superimposed output signal to the terminal device. The base station may send, to the terminal device on each resource, superimposed output signals obtained when all layers of signals are transmitted. Herein, there is at least one terminal device. When the N layers of data in step 101 are data obtained by using a transport block of a same terminal device, in step 103, the superimposed output signal may be sent only to the terminal device.

In addition, the base station may further send, to the terminal device, N, a modulation and coding scheme (MCS) for each layer of data, and a layer number i of the data that is obtained by using a transport block of the terminal device, so that after receiving the superimposed output signal, the terminal device decodes the received signal based on N, the MCS, and i.

104: The terminal device demodulates the received superimposed output signal.

After receiving, from the base station, a superimposed output signal that corresponds to each target resource, the terminal device may decode the superimposed output signal. The terminal device may receive one superimposed output signal on each target resource. When each layer of modulated signals corresponds to a plurality of constellation points, the terminal device may receive a plurality of superimposed output signals.

The terminal device may demodulate each superimposed output signal based on linear processing coefficients of each of the N layers of modulated signals on different resources. The linear processing coefficient corresponds to a target resource.

Alternatively, the terminal device may demodulate each superimposed output signal based on linear processing coefficients of each of the N layers of modulated signals on different resources and a power allocation coefficient. The linear processing coefficient and the power allocation coefficient correspond to a target resource. In this case, signals of different users with different channel quality may be distinguished by using the power allocation coefficient. That is, near-far matching users may be further distinguished by allocating power allocation coefficients.

In this embodiment of the present invention, a plurality of layers of signals of the at least one terminal device are separately modulated, linear processing is performed, on the target resource, on each of the N layers of modulated signals, the obtained linear processing signals are superimposed to obtain the superimposed output signal, and the superimposed output signal may be sent to the terminal device. The information transmission method can improve a system performance gain.

Figure 3:
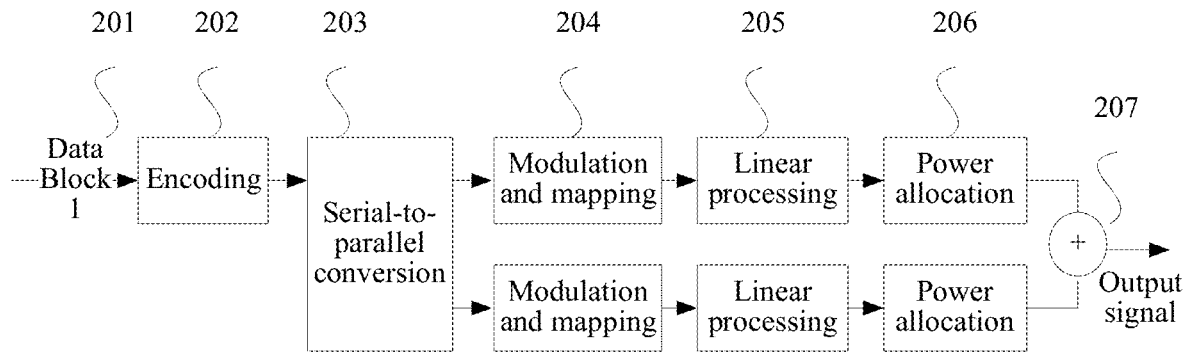
FIG. 3 is a schematic flowchart of an information transmission method according to another embodiment of the embodiments of the present invention.

FIG. 3 is a schematic flowchart of an information transmission method according to another embodiment of the embodiments of the present invention.

201: Obtain at least one transport block.

A base station may obtain at least one transport block that needs to be transmitted to a terminal device. It should be understood that herein, there may be one or more transport blocks.

When there are a plurality of transport blocks, the plurality of transport blocks may be for a same terminal device, or may be for different terminal devices.

202: Encode the obtained transport block.

The base station may encode the obtained transport block, to obtain an encoded transport block.

When a plurality of transport blocks are obtained in step 201, the plurality of transport blocks may be separately encoded. Herein, only one transport block is used in FIG. 3 as an example for description. A linear processing manner of each of the plurality of transport blocks is similar to a linear processing manner of the transport block in FIG. 3, and details are not described herein.

203: Perform serial-to-parallel conversion on encoded data.

The base station may perform serial-to-parallel conversion on the encoded data, to obtain a plurality of layers of parallel data. Two layers of data are used in FIG. 3 as an example for description. Linear processing manners of the layers of data are similar, and details are not described herein.

204: Modulate and map a plurality of layers of transport blocks separately.

The base station may modulate and map bit sequences of a plurality of layers of data separately, to obtain modulated signals of an $i^{th}$ layer of data on a $j^{th}$ resource, where i=1, 2, . . . , N, j=1, 2, . . . , J, J is a total quantity of resource numbers, J is a positive integer, and N is a positive integer.

205: Perform linear processing separately on different layers of modulated signals on different resources.

When different values are assigned to i and j, the base station may perform linear processing on all modulated signals of the $i^{th}$ layer of data on the $j^{th}$ resource, for example, so that each modulated signal is multiplied by a linear processing coefficient, to obtain linear processing signals of the $i^{th}$ layer of data on the $j^{th}$ resource.

The base station may first obtain linear processing coefficients of the $i^{th}$ layer of data on the $j^{th}$ resource, and then perform linear processing on the modulated signals separately based on the linear processing coefficients.

In this embodiment of the present invention, there may be a plurality of resources. Linear processing manners and sending manners of signals on the resources are similar. To avoid repetition, details are not described herein again.

206: Allocate a power allocation coefficient to linear processing signals.

The base station may first obtain power allocation coefficients of different layers of data, and then allocate, based on the power allocation coefficients, power allocation coefficients to different layers of linear processing signals.

207: Determine an output signal, and send the output signal to a terminal device.

The base station may determine the output signal based on the power allocation coefficients and the linear processing signals. Output signals on a same resource may be a superimposed output signal obtained after linear processing and superimposition are performed on all layers of modulated signals on the resource. For example, the base station may determine, based on a power allocation coefficient of the $i^{th}$ layer of data on the $j^{th}$ resource and linear processing signals of the $i^{th}$ layer of data on the $j^{th}$ resource, a superimposed output signal obtained when all layers of data are transmitted on the $j^{th}$ resource, and send the superimposed output signal to the terminal device.

A probability distribution of amplitudes or phases of a plurality of superimposed output signals obtained for different modulation channels should satisfy a Gaussian distribution. In this way, the superimposed output signals on a same resource can obtain a shaping gain, thereby improving a system performance gain.

When linear processing is performed on different layers of modulated signals to obtain different amplitudes or phases of different layers of linear processing signals, it can be ensured that a receive end correctly demodulates different layers of data. In this way, channel quality of terminal devices is no longer limited. That is, the terminal devices are no longer limited by a near-far matching scenario.

Step 201 to step 207 in the information transmission method in FIG. 3 may be performed by the network side device, for example, be performed by the base station. The following step 208 may be performed by the terminal device.

208: The terminal device demodulates a received superimposed output signal.

For a specific execution method for demodulating the received superimposed output signal by the terminal device in step 208, refer to step 104. To avoid repetition, details are not described herein again.

In the embodiments of the present invention, the steps in the embodiment of FIG. 3 correspond to the steps performed by an apparatus in the embodiment of FIG. 2. To avoid repetition, details are not described herein again.

The information transmission method according to the embodiments of the present invention is described in detail in the foregoing with reference to FIG. 2 and FIG. 3. An information transmission apparatus according to the embodiments of the present invention is described in detail in the following with reference to FIG. 4 to FIG. 7.

Figure 4:
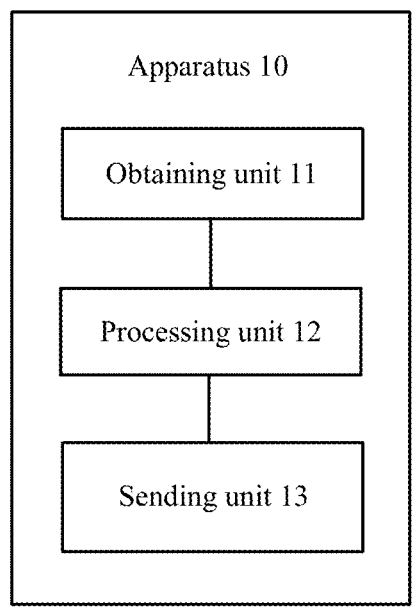
FIG. 4 is a block diagram of an information transmission apparatus according to an embodiment of the present invention.

FIG. 4 is a block diagram of an information transmission apparatus according to an embodiment of the present invention. The apparatus 10 in FIG. 4 may be a network side device, for example, a base station. In some scenarios, for example, in a D2D scenario, the apparatus 10 may alternatively be another terminal device. The apparatus 10 may include an obtaining unit 11, a processing unit 12, and a sending unit 13.

The obtaining unit 11 is configured to obtain N layers of modulated signals that need to be transmitted to at least one terminal device, where N is a positive integer greater than or equal to 2.

The processing unit 12 is configured to: multiply, on a target resource, each layer of modulated signals, obtained by the obtaining unit, by a linear processing coefficient corresponding to the layer, to obtain each layer of linear processing signals, and add all layers of linear processing signals up, to obtain a superimposed output signal. The linear processing coefficient is a complex number.

The sending unit 13 is configured to send, by using the target resource, the superimposed output signal obtained by the processing unit to the at least one terminal device.

In this embodiment of the present invention, a plurality of layers of signals of the at least one terminal device are separately modulated, linear processing is performed, on the target resource, on each of the N layers of modulated signals, the obtained linear processing signals are superimposed to obtain the superimposed output signal, and the superimposed output signal may be sent to the terminal device. In this way, a system performance gain can be improved.

The information transmission apparatus 10 in this embodiment of the present invention may correspond to the network side device in the information transmission method in the embodiments of the present invention. The foregoing and other operations or functions of the units/modules in the apparatus 10 are respectively intended to implement corresponding procedures of the network side device (for example, the base station) in the method flowcharts FIG. 2 and FIG. 3. For brevity, details are not described herein again.

Figure 5:
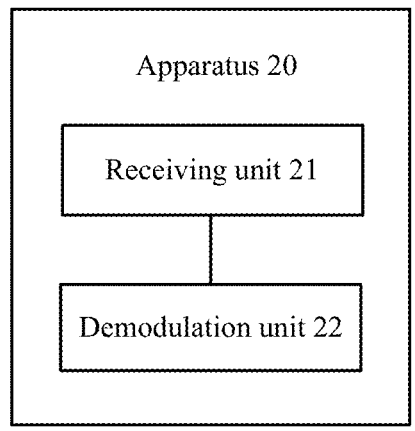
FIG. 5 is a block diagram of an information transmission apparatus according to another embodiment of the embodiments of the present invention.

FIG. 5 is a block diagram of an information transmission apparatus according to another embodiment of the embodiments of the present invention. The apparatus 20 in FIG. 5 may be a terminal device. In some scenarios, for example, in a macro/micro communications scenario, the apparatus 20 may alternatively be another network side device. The apparatus 20 may include a receiving unit 21 and a demodulation unit 22.

The receiving unit 21 is configured to receive, by using a target resource, a superimposed output signal from a network side device. The superimposed output signal is a sum of each of N layers of modulated signals multiplied by a linear processing coefficient corresponding to the layer. The linear processing coefficient is a complex number, and N is a positive integer greater than or equal to 2.

The demodulation unit 22 is configured to demodulate, based on the linear processing coefficient of each layer of modulated signals, the superimposed output signal obtained by the receiving unit.

The terminal device in this embodiment of the present invention may receive the superimposed output signal from the network side device, and demodulate the superimposed output signal. The linear processing coefficient of the superimposed output signal is a complex number. In this way, a system performance gain can be improved.

The information transmission apparatus 20 in this embodiment of the present invention may correspond to the terminal device in the information transmission method in the embodiments of the present invention. The foregoing and other operations or functions of the units/modules in the apparatus 20 are respectively intended to implement corresponding procedures of the terminal device in the method flowcharts FIG. 2 and FIG. 3. For brevity, details are not described herein again.

Figure 6:
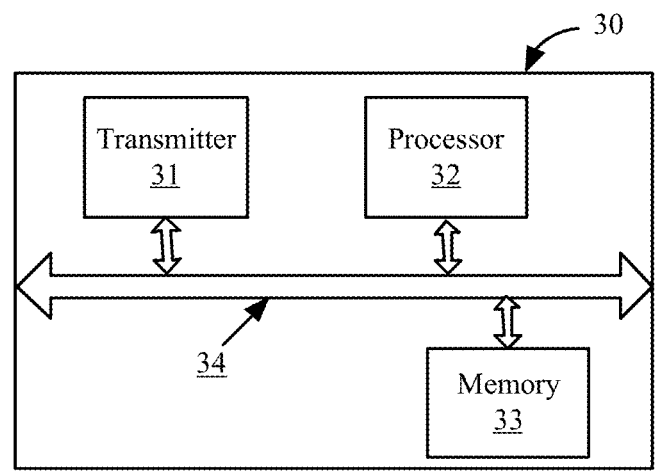
FIG. 6 is a block diagram of an information transmission apparatus according to another embodiment of the embodiments of the present invention.

FIG. 6 is a block diagram of an information transmission apparatus according to another embodiment of the embodiments of the present invention. The apparatus 30 in FIG. 6 may be a network side device, for example, a base station. In some scenarios, for example, in a D2D scenario, the apparatus 30 may alternatively be another terminal device. The apparatus 30 may include a transmitter 31, a processor 32, and a memory 33.

The processor 32 is configured to obtain N layers of modulated signals that need to be transmitted to at least one terminal device, where N is a positive integer greater than or equal to 2.

The processor 32 is further configured to: multiply, on each target resource in a target resource set, each of the N layers of modulated signals by a linear processing coefficient corresponding to the layer, to obtain each layer of linear processing signals, and add all layers of linear processing signals up, to obtain a superimposed output signal corresponding to each target resource. The linear processing coefficient is a complex number.

The transmitter 31 is configured to send, to the at least one terminal device by using each target resource, a superimposed output signal corresponding to the target resource.

In this embodiment of the present invention, a plurality of layers of signals of the at least one terminal device are separately modulated, linear processing is performed, on the target resource, on each of the N layers of modulated signals, the obtained linear processing signals are superimposed to obtain the superimposed output signal, and the superimposed output signal may be sent to the terminal device. In this way, a system performance gain can be improved.

The information transmission apparatus 30 in this embodiment of the present invention may correspond to the network side device in the information transmission method in the embodiments of the present invention. The foregoing and other operations or functions of the units/modules in the apparatus 30 are respectively intended to implement corresponding procedures of the network side device (for example, the base station) in the method flowcharts FIG. 2 and FIG. 3. For brevity, details are not described herein again.

The components of the apparatus 30, such as the transmitter 31, the processor 32, and the memory 33, may be coupled together by using a bus system 34. In addition to a data bus, the bus system 34 may further include a power bus, a control bus, a status signal bus, and the like. However, for clear description, various types of buses in the figure are marked as the bus system. The memory 33 may include a read-only memory and a random access memory, and provide an instruction and data to the processor 32. A part of the memory 33 may further include a non-volatile random access memory. For example, the memory 33 may store aggregation configuration information. The processor 32 may be configured to execute the instruction stored in the memory. When executing the instruction, the processor may perform the corresponding procedure of the corresponding apparatus in FIG. 2 and FIG. 3 in the foregoing method embodiments. For brevity, details are not described herein again.

Figure 7:
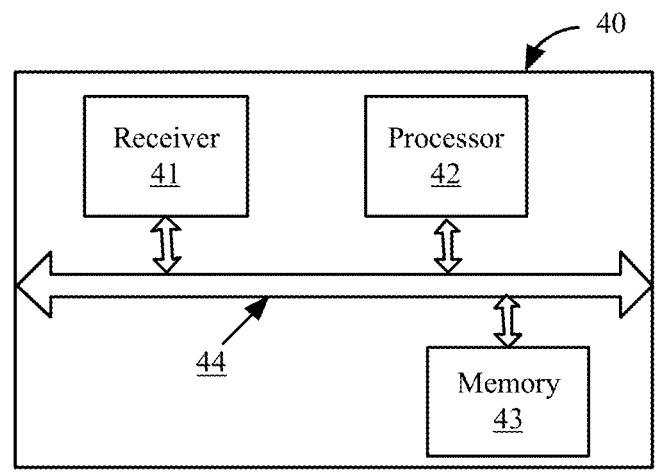
FIG. 7 is a block diagram of an information transmission apparatus according to another embodiment of the embodiments of the present invention.

FIG. 7 is a block diagram of an information transmission apparatus according to another embodiment of the embodiments of the present invention. The apparatus 40 in FIG. 7 may be a terminal device. In some scenarios, for example, in a macro/micro communications scenario, the apparatus 40 may alternatively be another network side device. The apparatus 40 may include a receiver 41, a processor 42, and a memory 43.

The receiver 41 may be configured to receive, from a network side device, by using each target resource in a target resource set, a superimposed output signal that corresponds to the target resource. The superimposed output signal is a sum of each of N layers of modulated signals multiplied by a linear processing coefficient corresponding to the layer. The linear processing coefficient is a complex number, and N is a positive integer greater than or equal to 2.

The processor 42 may demodulate N superimposed output signals.

The terminal device in this embodiment of the present invention may receive the superimposed output signal from the network side device, and demodulate the superimposed output signal. The linear processing coefficient of the superimposed output signal is a complex number. In this way, a system performance gain can be improved.

The information transmission apparatus 40 in this embodiment of the present invention may correspond to the terminal device in the information transmission method in the embodiments of the present invention. The foregoing and other operations or functions of the units/modules in the apparatus 40 are respectively intended to implement corresponding procedures of the terminal device in the method flowcharts FIG. 2 and FIG. 3. For brevity, details are not described herein again.

The components of the apparatus 40, such as the receiver 41, the processor 42, and the memory 43, may be coupled together by using a bus system 44. In addition to a data bus, the bus system 44 may further include a power bus, a control bus, a status signal bus, and the like. However, for clear description, various types of buses in the figure are marked as the bus system. The memory 43 may include a read-only memory and a random access memory, and provide an instruction and data to the processor 42. A part of the memory 43 may further include a non-volatile random access memory. For example, the memory 43 may store aggregation configuration information. The processor 42 may be configured to execute the instruction stored in the memory. When executing the instruction, the processor may perform the corresponding procedures of the corresponding apparatuses in FIG. 2 and FIG. 3 in the foregoing method embodiments. For brevity, details are not described herein again.

Figure 8:
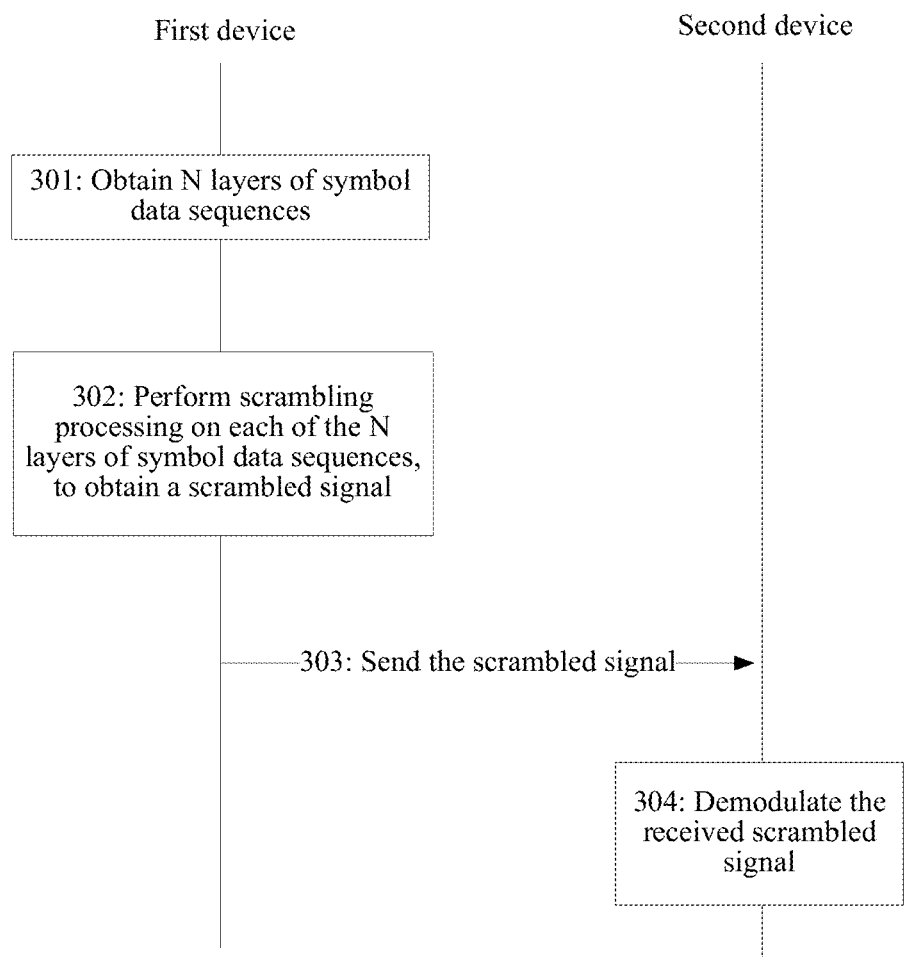
FIG. 8 is a schematic interaction flowchart of an information transmission method according to an embodiment of the present invention.

FIG. 8 is a schematic interaction flowchart of an information transmission method according to an embodiment of the present invention. This embodiment of the present invention is applied to an information transmission system. The system includes at least a first device and a second device. In an embodiment of the present invention, when the first device is a base station, the second device may be UE. When the first device is UE, the second device may be a base station.

301: The first device obtains N layers of symbol data sequences.

In an embodiment of the present invention, the N layers of symbol data sequences may be generated by the first device.

In an embodiment of the present invention, the N layers of symbol data sequences may be for a same first device, or may be for different first devices. In addition, the N layers of symbol data sequences may be obtained by using a same transport block of a same first device, or may be obtained by using different transport blocks of a same first device. For example, N layers of data may be obtained through serial-to-parallel conversion after a same transport block of a same first device is encoded, or may be obtained through serial-to-parallel conversion after different transport blocks of a same first device are encoded, or may be obtained through serial-to-parallel conversion after different transport blocks of different first devices are encoded.

In an embodiment of the present invention, the N layers of symbol data sequences in this embodiment of the present invention may be obtained in the following manner: The first device obtains at least one transport block that needs to be transmitted to the second device, encodes the obtained transport block, performs serial-to-parallel conversion to obtain a plurality of layers of data, modulates and maps bit sequences of the plurality of layers of data, and the like, to obtain the N layers of symbol data sequences.

In this embodiment of the present invention, N may be determined by the first device. For example, the first device is a base station, and the second device is UE. The first device sends indication information to the second device, where the indication information includes a quantity N of layers. Alternatively, N may be determined by the first device based on indication information received from the second device. For example, the first device is UE, and the second device is a base station. The second device sends indication information to the first device, where the indication information includes a quantity N of transmission layers. Alternatively, N may be a predefined quantity of layers.

302: The first device performs scrambling processing on each of the N layers of symbol data sequences, to obtain a scrambled signal.

When N>1, the first device performs scrambling processing on each of the N layers of symbol data sequences, to obtain a scrambled symbol data signal corresponding to each layer; and superimposes the N layers of scrambled symbol data signals to obtain the scrambled signal. For example, when N>1, the scrambled signal is represented as $x_j = \sum_{n=0}^{N-1} \beta_{j\%Q}^{idx_n} \cdot s_j^n$, where is a superimposed output signal corresponding to a data selection index j of symbol data sequences, $s_j^n$ is an output signal of a modulated symbol corresponding to a data selection index j of an $n^{th}$ layer of symbol data sequence, $\beta_{j\%Q}^{idx_n}$ is a scrambling coefficient corresponding to the data selection index j corresponding to the $n^{th}$ layer of symbol data sequence, and $idx_n$ is a scrambling sequence selection index corresponding to an $n^{th}$ layer of symbol data sequence.

When N=1, after performing scrambling processing on the symbol data sequences to obtain the scrambled signal, the first device may directly send the scrambled signal to the second device, with no need to perform N-layer superimposition.

In an embodiment of the present invention, to perform scrambling processing on each layer of symbol data sequence, first, a scrambling sequence corresponding to each layer of symbol data sequence may be determined, and then, a scrambling coefficient in the scrambling sequence is multiplied by symbol data in a corresponding symbol data sequence.

In an embodiment of the present invention, the first device may determine, in the following manner, the scrambling sequence corresponding to each layer of symbol data sequence: determining N scrambling sequence selection indexes based on a quantity N of layers of the symbol data sequences, where each layer of symbol data sequence corresponds to one scrambling sequence selection index, and each scrambling sequence selection index corresponds to one scrambling sequence; and selecting, from a predefined scrambling sequence set, a scrambling sequence corresponding to each scrambling sequence selection index.

In an embodiment of the present invention, when N>1, at least two of the N scrambling sequence selection indexes are different.

In this embodiment of the present invention, there are a plurality of manners of determining the N scrambling sequence selection indexes.

For example, when the first device is UE, and the second device is a base station, the UE may receive the N scrambling sequence selection indexes scheduled by the base station. Specifically, the base station may send the N scrambling sequence selection indexes to the UE.

For another example, when the first device is UE, and the second device is a base station, the UE may further determine the N scrambling sequence selection indexes based on a device number value of the UE and a size P of the predefined scrambling sequence set. Specifically, the UE may find, based on the number value of the UE, a scrambling sequence set corresponding to the number value, and determine the N scrambling sequence selection indexes in the scrambling sequence set. Each scrambling sequence selection index may be used to indicate any scrambling sequence in the scrambling sequence set.

For another example, when the first device is a base station, and the second device is UE, the base station may sequentially and circularly select the N scrambling sequence selection indexes based on a size P of the predefined scrambling sequence set.

In an embodiment of the present invention, the scrambling sequence set may be a scrambling matrix constituted by Q sequences that are obtained by performing full permutation on elements in a base sequence having a length of P. Specifically, the first device may obtain a base sequence having a length of P, and perform full permutation on elements in the base sequence, to obtain Q sequences. The Q sequences construct a scrambling matrix of P rows and Q columns, where P is a positive integer, and P≥2. Each row in the scrambling matrix constitutes one scrambling sequence. For the P rows, there are a total of P scrambling sequences. A set constituted by the P scrambling sequences is the scrambling sequence set, and selection indexes of the P scrambling sequences are integers from 0 to P−1.

For example, a quantity P of transmission layers for superimposition is determined, and the base sequence having the length of P is obtained. The base sequence is the following column vector: $\vec{\beta} = [\beta_0, \beta_1, \ldots, \beta_{P-1}]^T$.

Full permutation is performed based on elements of the foregoing base sequence $\vec{\beta}$ to obtain P! permutation sequences. All the permutation sequences are used as column vectors of one scrambling matrix, to construct a P*Q scrambling matrix, where Q satisfies Q=P!. For example, a 3*6 scrambling matrix constructed by a base sequence $\{\beta_0, \beta_1, \beta_2\}$ having a length of 3 is as follows:

$$\beta = \begin{bmatrix} \beta_0 & \beta_0 & \beta_1 & \beta_1 & \beta_2 & \beta_2 \\ \beta_1 & \beta_2 & \beta_0 & \beta_2 & \beta_0 & \beta_1 \\ \beta_2 & \beta_1 & \beta_2 & \beta_0 & \beta_1 & \beta_0 \end{bmatrix}$$

A row vector of the scrambling matrix is used as a scrambling sequence. In this case, the P*Q scrambling matrix corresponds to a scrambling sequence set whose size is P. Each scrambling sequence has a length of Q.

It is assumed that $s^n$ is a modulated output signal corresponding to an $n^{th}$ layer, and a base sequence has a length of N. In this case, a design of the base sequence needs to satisfy at least one of the following conditions: (1) A Euclidean distance between constellation points corresponding to linear superimposition output $x = \sum_{n=0}^{P-1} \beta_n \cdot s^n$ of N layers of symbol data is maximum; (2) At least one of amplitudes and phases of constellation points corresponding to linear superimposition output $x = \sum_{n=0}^{P-1} \beta_n \cdot s^n$ of N layers of symbol data satisfy a Gaussian distribution; (3) When an element of the base sequence is a complex number $\beta_P = A_P \cdot e^{j\varphi_P}$, at least one of amplitudes and phases corresponding to different elements are different, where $A_P$ is amplitude information, $\varphi_P$ is phase information. For example, a sequence having a length of 3 may be {0.6071, 0.9809, 1.2919}.

In an embodiment of the present invention, performing scrambling processing on the layer of symbol data sequence by using the scrambling sequence includes: determining a coefficient selection index of a corresponding scrambling sequence based on a data selection index of the symbol data sequences, determining a scrambling coefficient based on the coefficient selection index of scrambling, and performing linear multiplication on a data symbol corresponding to the data selection index of the symbol data sequences and the corresponding scrambling coefficient.

In this embodiment of the present invention, the index of the symbol data sequences may be determined by using the scrambling sequence and the coefficient selection index of the scrambling sequence. For example, the symbol data that is in the symbol data sequences and that corresponds to the scrambling coefficient in the scrambling sequence may be determined in the following manner: Assuming that a length of the scrambling sequence is Q, the coefficient selection index of the scrambling sequence is q, and the index of the symbol data sequences is j, q satisfies a modulo operation q=j%Q. The coefficient selection index of the scrambling sequence is used to indicate the scrambling coefficient in the scrambling sequence, and the index of the symbol data sequences is used to indicate the symbol data in the symbol data sequence.

303: The first device sends the scrambled signal to the second device, and the second device receives the scrambled signal.

After obtaining the scrambled signal in step 302, the first device may send the scrambled signal to the second device, so that the second device demodulates the scrambled signal, and so on.

304: The second device demodulates the received scrambled signal.

After receiving the scrambled signal, the second device may demodulate the scrambled signal based on a quantity N of superimposed layers of the symbol data sequences and the scrambling sequence selection indexes respectively corresponding to the N layers of symbol data sequences.

In an embodiment of the present invention, the second device may determine the quantity N of superimposed layers in the following manner: The second device may receive, from the first device, the quantity N of superimposed layers of the symbol data sequences. Alternatively, the second device may obtain a predefined maximum quantity of superimposed layers, and use the maximum quantity of superimposed layers as the quantity N of superimposed layers of the symbol data sequences.

When the first device is UE, and the second device is a base station, the scrambling sequence selection index in this embodiment of the present invention may be determined by the base station and scheduled to the UE. In this way, the base station may determine the N scrambling sequence selection indexes and send the N scrambling sequence selection indexes to the UE. Each layer of symbol data sequence corresponds to one scrambling sequence selection index, and a corresponding scrambling sequence can be found by using the scrambling sequence selection index.

For decoding in this embodiment of the present invention, refer to a modulation and coding scheme MCS for each layer of symbol data sequence. For a specific decoding manner, refer to the method in the prior art, and details are not described in detail herein.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

This embodiment of the present invention implements multiuser detection based on scrambling processing, and imposes no limit on distances of users. In this way, an application scenario of a multiple access technology can be enlarged while improving a system performance, without being limited to near-far matching users.

Figure 9:
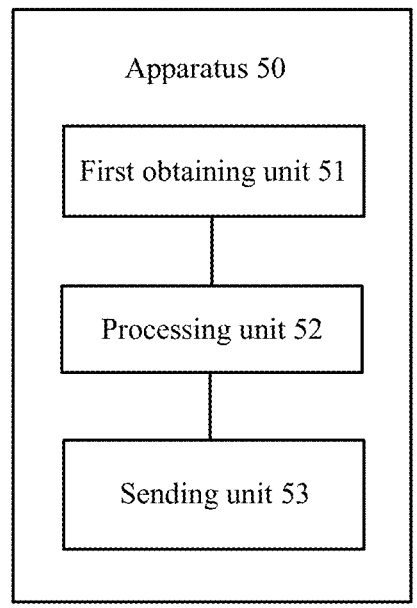
FIG. 9 is a block diagram of an information transmission apparatus according to an embodiment of the present invention.

FIG. 9 is a block diagram of an information transmission apparatus according to an embodiment of the present invention. The apparatus 50 in FIG. 9 may be the first device in the method procedure in FIG. 8, may be a network side device such as a base station, or may be a terminal device. The apparatus 50 may include a first obtaining unit 51, a processing unit 52, and a sending unit 53.

The first obtaining unit 51 is configured to obtain N layers of symbol data signals, where N is a positive integer.

The processing unit 52 is configured to perform scrambling processing on each of the N layers of symbol data sequences obtained by the first obtaining unit, to obtain a scrambled signal.

The sending unit 53 is configured to send the scrambled signal to a second device.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

The information transmission apparatus 50 in this embodiment of the present invention may correspond to the first device in the information transmission method in the embodiment shown in FIG. 8 of the embodiments of the present invention. The foregoing and other operations or functions of the units/modules in the apparatus 50 are respectively intended to implement corresponding procedures of the first device in the method flowchart FIG. 5. For brevity, details are not described herein again.

Figure 10:
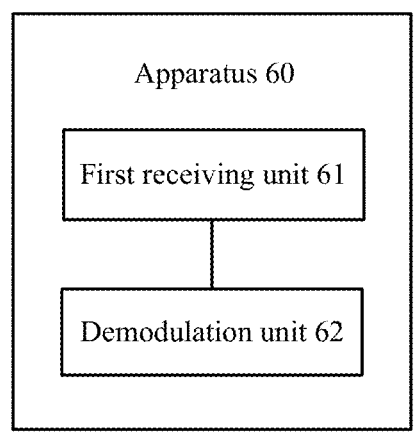
FIG. 10 is a block diagram of an information transmission apparatus according to another embodiment of the embodiments of the present invention.

FIG. 10 is a block diagram of an information transmission apparatus according to another embodiment of the embodiments of the present invention. The apparatus 60 in FIG. 10 may be a network side device or a terminal device. The apparatus 60 may include a first receiving unit 61 and a demodulation unit 62.

The first receiving unit 61 is configured to receive a scrambled signal from a first device. The scrambled signal is obtained by the first device by performing scrambling processing on each of obtained N layers of symbol data sequences, and N is a positive integer.

The demodulation unit 62 is configured to demodulate the scrambled signal received by the first receiving unit.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

The information transmission apparatus 60 in this embodiment of the present invention may correspond to the second device in the information transmission method in the embodiment shown in FIG. 8 of the embodiments of the present invention. The foregoing and other operations or functions of the units/modules in the apparatus 60 are respectively intended to implement corresponding procedures of the second device in the method flowchart FIG. 5. For brevity, details are not described herein again.

Figure 11:
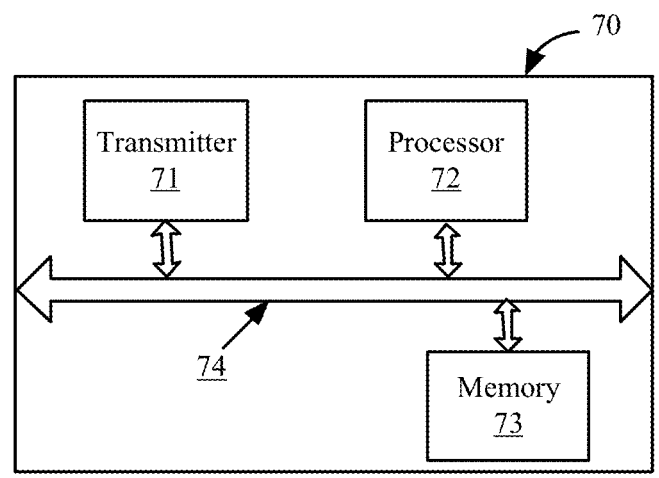
FIG. 11 is a block diagram of an information transmission apparatus according to another embodiment of the embodiments of the present invention.

FIG. 11 is a block diagram of an information transmission apparatus according to another embodiment of the embodiments of the present invention. The apparatus 70 in FIG. 11 may be the first device in the method embodiment in FIG. 7. The apparatus 70 may include a transmitter 71, a processor 72, and a memory 73.

The processor 72 is configured to obtain N layers of symbol data signals, and perform scrambling processing on each of the N layers of symbol data sequences, to obtain a scrambled signal, where N is a positive integer.

The transmitter 71 is configured to send the scrambled signal to a second device.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

The components of the apparatus 70, such as the transmitter 71, the processor 72, and the memory 73, may be coupled together by using a bus system 74. In addition to a data bus, the bus system 74 may further include a power bus, a control bus, a status signal bus, and the like. However, for clear description, various types of buses in the figure are marked as the bus system. The memory 73 may include a read-only memory and a random access memory, and provide an instruction and data to the processor 72. A part of the memory 73 may further include a non-volatile random access memory. For example, the memory 73 may store aggregation configuration information. The processor 42 may be configured to execute the instruction stored in the memory. When executing the instruction, the processor may perform the corresponding procedures of the first device in FIG. 7 in the foregoing method embodiment. For brevity, details are not described herein again.

The information transmission apparatus 70 in this embodiment of the present invention may correspond to the first device in the information transmission method in the embodiments of the present invention. The foregoing and other operations or functions of the units/modules in the apparatus 70 are respectively intended to implement corresponding procedures of the first device in the method flowchart FIG. 7. For brevity, details are not described herein again.

Figure 12:
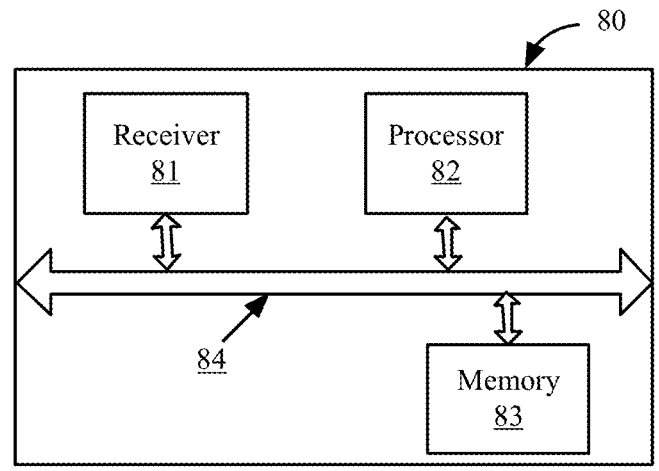
FIG. 12 is a block diagram of an information transmission apparatus according to another embodiment of the embodiments of the present invention.

FIG. 12 is a block diagram of an information transmission apparatus according to another embodiment of the embodiments of the present invention. The apparatus 80 in FIG. 12 may be the second device in the method embodiment in FIG. 7. The apparatus 80 may include a receiver 81, a processor 82, and a memory 83.

The receiver 81 is configured to receive a scrambled signal from a first device. The scrambled signal is obtained by the first device by performing scrambling processing on each of obtained N layers of symbol data sequences, and N is a positive integer.

The processor 82 is configured to demodulate the received scrambled signal.

In this embodiment of the present invention, scrambling processing is performed on each layer of symbol data sequence, a scrambled signal is obtained based on a processing result, and the scrambled signal is sent to another device, so that the another device demodulates the scrambled signal. Such an information transmission method in which multiuser detection is implemented based on scrambling processing can improve a system performance gain.

The components of the apparatus 80, such as the receiver 81, the processor 82, and the memory 83, may be coupled together by using a bus system 84. In addition to a data bus, the bus system 84 may further include a power bus, a control bus, a status signal bus, and the like. However, for clear description, various types of buses in the figure are marked as the bus system. The memory 83 may include a read-only memory and a random access memory, and provide an instruction and data to the processor 82. A part of the memory 83 may further include a non-volatile random access memory. For example, the memory 83 may store aggregation configuration information. The processor 82 may be configured to execute the instruction stored in the memory. When executing the instruction, the processor may perform the corresponding procedures of the second device in FIG. 7 in the foregoing method embodiments. For brevity, details are not described herein again.

The information transmission apparatus 80 in this embodiment of the present invention may correspond to the second device in the information transmission method in the embodiments of the present invention. The foregoing and other operations or functions of the units/modules in the apparatus 80 are respectively intended to implement corresponding procedures of the second device in the method flowchart FIG. 7. For brevity, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the embodiments of the present invention.

Methods or steps described in the embodiments disclosed in this specification may be implemented by hardware, a software program executed by a linear processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments of the present invention are described in detail with reference to the accompany drawings and in combination with the examples of embodiments, but the embodiments of the present invention are not limited thereto. Various equivalent variations or replacements can be made by a person of ordinary skill in the art to the embodiments of the present invention, and shall fall within the protection scope of the present invention.

What is claimed is:

1. An information transmission method, comprising:
   receiving, by a second device, a scrambled signal from at least one first device, wherein the scrambled signal is obtained by the first device by performing scrambling processing on each of obtained N layers of symbol data sequences, and N is a positive integer;
   obtaining, by the second device, a quantity N of superimposed layers of the symbol data sequences;
   randomly determining, by the second device, scrambling sequence selection indexes respectively corresponding to the N layers of symbol data sequences; and
   demodulating, by the second device, the scrambled signal based on the scrambling sequence selection indexes respectively corresponding to the N layers of symbol data sequences.

2. The method according to claim 1, wherein the obtaining, by the second device, a quantity N of superimposed layers of the symbol data sequences comprises at least one of:
   receiving, by the second device, from the first device, the quantity N of superimposed layers of the symbol data sequences;
   obtaining, by the second device, a predefined quantity N of superimposed layers of the symbol data sequences; or
   determining, by the second device, the quantity N of superimposed layers of the symbol data sequences based on indication information of the second device.

3. The method according to claim 2, wherein a length of a scrambling sequence is Q, and a data selection index of the symbol data sequences is j, a coefficient selection index q of the scrambling sequence satisfies a modulo operation q=j % Q, wherein the coefficient selection index q of the scrambling sequence is used to indicate a scrambling coefficient in the scrambling sequence, and the data selection index j of the symbol data sequences is used to indicate symbol data in the symbol data sequences.

4. The method according to claim 1, wherein when N>1, the scrambled signal is superimposition of N layers of scrambled symbol data signals, and each layer of scrambled symbol data signals is obtained by the first device by performing scrambling processing on a corresponding layer of symbol data sequence.

5. The method according to claim 1, wherein the method further comprises:
sending, by the second device, the N scrambling sequence selection indexes to the first device, wherein each layer of symbol data sequence corresponds to one scrambling sequence selection index.

6. An information transmission apparatus, comprising:
a processor, configured to:
obtain N layers of symbol data sequences, wherein N is a positive integer; and
perform scrambling processing on each of the N layers of symbol data sequences to obtain a scrambled signal, wherein performing the scrambling processing includes:
determining a scrambling sequence corresponding to each layer of symbol data sequence; and
multiplying a scrambling coefficient in the scrambling sequence by symbol data in a corresponding symbol data sequence, wherein a length of the scrambling sequence is Q, and a data selection index of the symbol data sequences is j, a coefficient selection index q of the scrambling sequence satisfies a modulo operation q=j % Q, wherein the coefficient selection index q of the scrambling sequence is used to indicate the scrambling coefficient in the scrambling sequence, and the data selection index j of the symbol data sequences is used to indicate symbol data in the symbol data sequences; and
a transmitter, configured to send the scrambled signal to a second device.

7. The apparatus according to claim 6, wherein when N>1, the processor is specifically configured to: perform scrambling processing on the N layers of symbol data sequences separately, to obtain N layers of scrambled symbol data signals; and superimpose the N layers of scrambled symbol data signals, to obtain a final scrambled signal.

8. The apparatus according to claim 6, wherein the processor is configured to: determine N scrambling sequence selection indexes based on a quantity N of layers of the symbol data sequences; and select, from a predefined scrambling sequence set, a scrambling sequence corresponding to each scrambling sequence selection index, wherein each layer of symbol data sequence corresponds to one scrambling sequence selection index, and each scrambling sequence selection index corresponds to one scrambling sequence.

9. The apparatus according to claim 8, wherein when N>1, at least two of the N scrambling sequence selection indexes are different.

10. The apparatus according to claim 8, wherein the apparatus further comprises a receiver; and at least one of:
the receiver is specifically configured to receive the N scrambling sequence selection indexes indicated by the second device;
the processor is configured to randomly determine the N scrambling sequence selection indexes based on a number value of the apparatus and a size P of the predefined scrambling sequence set, wherein P is a positive integer greater than or equal to N; or
the processor is configured to sequentially and circularly select the N scrambling sequence selection indexes based on a size P of the predefined scrambling sequence set.

11. The apparatus according to claim 8, wherein the processor is configured to obtain a base sequence having a length of P, wherein P is a positive integer, and P≥2; and
the processor is further configured to: perform full permutation on elements in the base sequence, to obtain Q sequences; and construct a scrambling matrix of P rows and Q columns based on the Q sequences, wherein Q satisfies Q=P!, each row in the scrambling matrix constitutes one scrambling sequence, a set constituted by P scrambling sequences is the scrambling sequence set, and selection indexes of the P scrambling sequences are integers from 0 to P−1.

12. The apparatus according to claim 6, wherein at least one of N is determined by the apparatus, N is carried in indication information of the second device, or N is a predefined quantity of transmission layers.

13. An information transmission apparatus, comprising:
a receiver, configured to receive a scrambled signal from a first device, wherein the scrambled signal is obtained by the first device by performing scrambling processing on each of obtained N layers of symbol data sequences, and N is a positive integer; and
a processor, configured to:
obtain a quantity N of superimposed layers of the symbol data sequences;
randomly determine scrambling sequence selection indexes respectively corresponding to the N layers of symbol data sequences; and
demodulate the scrambled signal received by the receiver based on the scrambling sequence selection indexes respectively corresponding to the N layers of symbol data sequences.

14. The apparatus according to claim 13, wherein the processor is configured to at least one of:
receive, from the first device, the quantity N of superimposed layers of the symbol data sequences;
obtain a predefined quantity N of superimposed layers of the symbol data sequences; or
determine the quantity N of superimposed layers of the symbol data sequences based on indication information of the apparatus.

15. The apparatus according to claim 14, wherein a length of a scrambling sequence is Q, and a data selection index of the symbol data sequences is j, a coefficient selection index q of the scrambling sequence satisfies a modulo operation q=j % Q, wherein the coefficient selection index q of the scrambling sequence is used to indicate a scrambling coefficient in the scrambling sequence, and the data selection index j of the symbol data sequences is used to indicate symbol data in the symbol data sequences.

16. The apparatus according to claim 13, wherein when N>1, the scrambled signal is superimposition of N layers of scrambled symbol data signals, and each layer of scrambled symbol data signals is obtained by the first device by performing scrambling processing on a corresponding layer of symbol data sequence.

\* \* \* \* \*

UNITED STATES PATENT AND TRADEMARK OFFICE
CERTIFICATE OF CORRECTION

PATENT NO. : 10,637,612 B2
APPLICATION NO. : 16/120854
DATED : April 28, 2020
INVENTOR(S) : Zhengwei Gong and Longbao Wang It is certified that error appears in the above-identified patent and that said Letters Patent is hereby corrected as shown below:

In the Claims

In Column 31, Line 48, in Claim 7, before "configured" delete "specifically".

In Column 32, Line 1, in Claim 10, before "configured" delete "specifically".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*